United States Patent
Boening et al.

(10) Patent No.: US 9,015,679 B2
(45) Date of Patent: Apr. 21, 2015

(54) SYSTEM AND METHOD FOR TRANSLATING BUSINESS APPLICATION FUNCTIONS INTO DBMS INTERNAL PROGRAMMING LANGUAGE PROCEDURES

(71) Applicants: Jens Boening, Heidelberg (DE);
Karsten Schmidt, Karsten (DE);
Xiaohui Xue, Courbevoie (FR);
Christian Mathis, Wachenheim (DE)

(72) Inventors: Jens Boening, Heidelberg (DE);
Karsten Schmidt, Karsten (DE);
Xiaohui Xue, Courbevoie (FR);
Christian Mathis, Wachenheim (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 13/942,944

(22) Filed: Jul. 16, 2013

(65) Prior Publication Data
US 2015/0026668 A1  Jan. 22, 2015

(51) Int. Cl.
*G06F 9/45* (2006.01)

(52) U.S. Cl.
CPC ..................................... *G06F 8/51* (2013.01)

(58) Field of Classification Search
CPC ........................................................ G06F 8/51
USPC ................................................. 717/137, 140
See application file for complete search history.

(56) References Cited

U.S. PATENT DOCUMENTS

| | | | |
|---|---|---|---|
| 4,667,290 A | 5/1987 | Goss et al. | |
| 5,313,614 A | 5/1994 | Goettelmann et al. | |
| 7,356,804 B2 | 4/2008 | Blumenthal et al. | |
| 7,690,001 B2 | 3/2010 | Sabev | |
| 7,934,206 B2 | 4/2011 | Butler et al. | |
| 8,171,018 B2* | 5/2012 | Zane et al. | 707/718 |
| 8,171,486 B2 | 5/2012 | Sabev | |
| 8,261,248 B2 | 9/2012 | Brendle et al. | |
| 2006/0288353 A1 | 12/2006 | King et al. | |
| 2010/0153927 A1 | 6/2010 | Stall et al. | |
| 2011/0154433 A1 | 6/2011 | Karabulut | |
| 2012/0005190 A1 | 1/2012 | Faerber et al. | |
| 2012/0239680 A1 | 9/2012 | Gudla et al. | |
| 2013/0002686 A1 | 1/2013 | Kota et al. | |
| 2013/0104100 A1 | 4/2013 | Mueller | |

OTHER PUBLICATIONS

Flodin et al., "Using Queries with Multi-Directional Functions for Numerical Database Applications", 1998, Presented at 2nd East-European Symposium on Advances in Databases and Information Systems, 14 pages.*
Encyclopedia of Database System, "Section J", 2009, Springer Science+Business Media, LLC, pp. 1577-1583.*

* cited by examiner

Primary Examiner — Ted T Vo
(74) Attorney, Agent, or Firm — Buckley, Maschoff & Talwalkar LLC

(57) ABSTRACT

A system and method for generating a database management system (DBMS) internal program language function from a foreign program language function. The method includes loading the foreign function into a DBMS server, an internal program module unit, examining the foreign function to determine whether the foreign function is annotated for translation, if annotated determining if the foreign function is translated into an internal program language function and executing the internal program language function, else compiling the foreign function into an internal function. If the foreign function is not annotated for translation, executing the foreign program language function. The DBMS system includes a parsing unit, a type inference unit, a normalizer unit, a serializer unit, and a deployer unit. A computer readable medium is also disclosed.

16 Claims, 6 Drawing Sheets

SYSTEM AND METHOD FOR TRANSLATING BUSINESS APPLICATION FUNCTIONS INTO DBMS INTERNAL PROGRAMMING LANGUAGE PROCEDURES

BACKGROUND

Python is a high-level programming language used in a variety of application domains (e.g., web development, database access, GUI development, etc.). Python application servers that are built on top of a third-party database management system (DBMS)—e.g., SAP HANA®, can interact with that database management system's database. Other foreign application programming languages (e.g., Advanced Business Application Programming (ABAP), Java, Javascript, C, C++, Ruby, etc.) can also interact with a DBMS's database.

Mapping data between database tables and object-oriented programming objects can be done with an ORM (Object Relational Mapping) programming model. This relational mapping maps rows of a database table to objects in the (host) programming language in which the application is written. If the application needs to access data, the ORM framework fetches the data from the database and loads it into the application runtime, which is located on the application server layer. The data is transformed into an ORM object ready to be used by the application.

Conversely if the application creates new data, it creates new objects. If the objects become persisted in the database system, the ORM framework can convert the objects into database rows and pass them to the database system for storage. ORM presents multiple advantages such as abstraction from the underlying database and allows declarative coding (set-based processing).

One Python ORM for SAP HANA is designed by SAP Labs, Palo Alto, Calif. The example code below gives an example of this ORM.

Pseudo Code (1)

```
inputTS = TimeSeries( )
result = list( )
for ts in inputTS:
    if ts.Qty > 200:
        schedule=ScheduleSeries(Date=ts.Date, Qty=ts.Qty)
        result.append(schedule)
```

The variable inputTS has been assigned to TimeSeries( ), which is the ORM class representing the table TimeSeries in the SAP HANA database. The variable inputTS corresponds to a list of TimeSeries objects that represent the rows in the table TimeSeries. This example program iterates over each TimeSeries object (i.e., for is in inputTS) and checks if its quantity 2 exceeds 200 (i.e., ts.Qty>200). The result provides all TimeSeries objects that satisfy this condition. The result is also a list of ORM objects representing the SAP HANA table ScheduleSeries (i.e., ScheduleSeries(Date=ts.Date, Qty=ts.Qty)). To store the result, it will be persisted in SAP HANA into the corresponding table ScheduleSeries.

In such a Python program, two database interactions are required between the DBMS database and the Python application server; first to fetch the TimeSeries, and second to persist ScheduleSeries. When multiple database interactions are required, especially when the volume of data to transfer is large, the time required for data transfer can become very important and critically impact the application performance.

DETAILED DESCRIPTION

In accordance with some embodiments, a translator module unit compiles a foreign programming language application (e.g., Python, Java, Java script, etc.) and generates an equivalent DBMS internal programming language (e.g., L language for SAP HANA) program inside the DBMS to perform the same tasks. As an example of a DBMS internal programming language, L language is a robust, low-level, high-performance programming language which allows the compilation and execution of code at runtime.

The high-level foreign programming language makes application development less challenging, and less expensive, for developers than if the business application was developed in the DBMS lower-level language. In accordance with embodiments, developers can continue working in a high-level foreign language to create business applications, which can then be translated into the DBMS internal language by embodying systems and methods described below.

Embodying components reduce the overhead of a transaction (e.g., processing, communication, translation, etc.) associated with foreign programming language applications. This reduction can be achieved by translating the foreign application, including the ORM manipulation, into the DBMS internal programming language (e.g., translating a Python program application into L language). The translated program is deployed in the DBMS, where it is executed.

Figure 1:
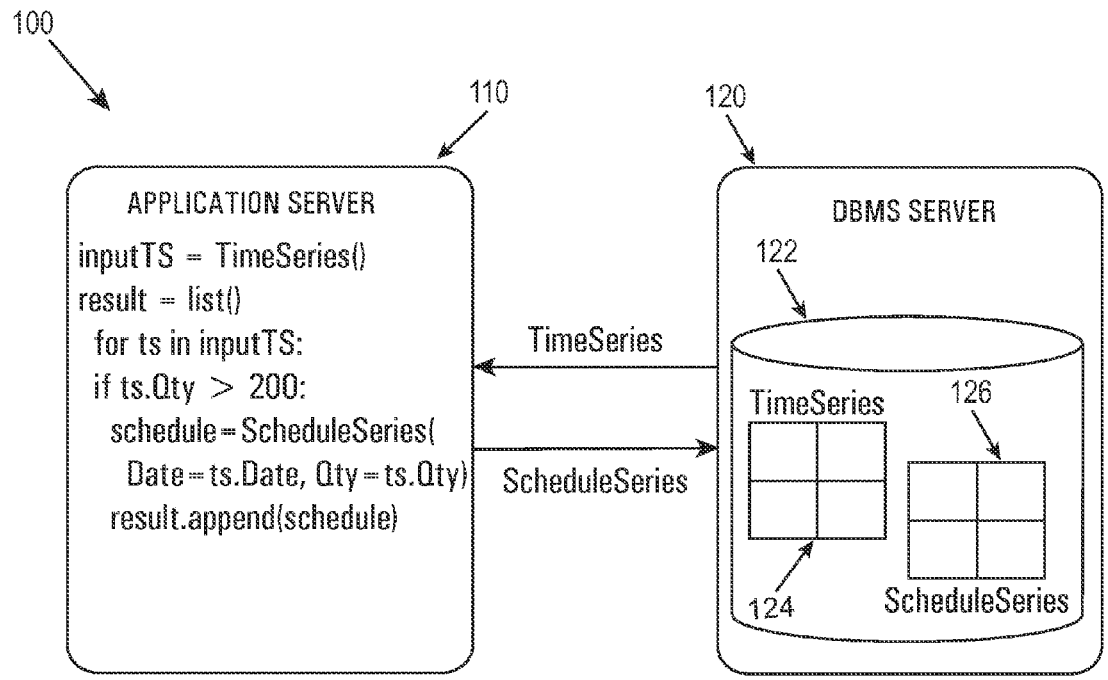
FIG. 1 depicts a conventional application-DBMS interaction scenario.

FIG. 1 depicts a conventional application-DBMS interaction scenario 100. Application server 110 interacts with DBMS 120, which includes database 122, a first time to obtain data from a first table TimeSeries table 124. Then the application server interacts with the DBMS a second time to persist results in a second table ScheduleSeries table 126. In some implementations, the first table and the second table can be the same table in the database. This scenario of two interactions is typical of a Python application interaction with SAP HANA DBMS.

Figure 2:
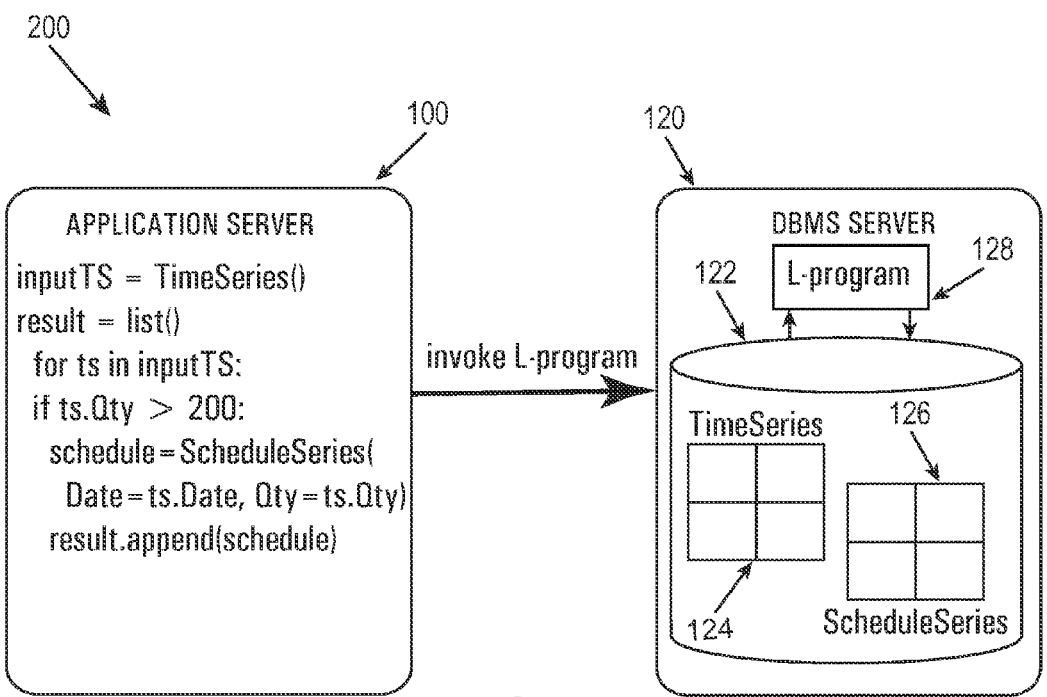
FIG. 2 depicts an application-DBMS interaction scenario in accordance with some embodiments.

FIG. 2 depicts application-DBMS interaction scenario 200 in accordance with some embodiments. In accordance with these embodiments, application server 110 invokes an L-program resident in L-program module unit 128, which is part of DBMS 120. The L-program module unit interacts with database 122 to affect the application logic and data transfer. Data transfer between the application server and the DBMS (e.g., SAP HANA) is no longer required to implement the business application. Application-DBMS interaction scenario 200, in accordance with embodiments, eliminates the data transfer overhead. With such an approach, developers can do fast application development with the foreign program language (e.g., Python, Java, etc.), to take advantage of its rich library packages and existing development kits. This approach also assures better application performance by translating the foreign program language application into the DBMS internal program language, so that it can run inside the DBMS.

In accordance with some embodiments, business application programs need not be translated into the DBMS internal program language in their entirety. Often a business application includes different parts—e.g., business logic, user interface logic, control logic, etc. The business logic portion of the business application can be translated into the DBMS internal program language to reduce the transaction overheads as discussed above.

The business logic can be enclosed in a function invoked by UI control. The function itself may even be decomposed into other functions. The code below (Pseudo Code 2) rearranges the Python program above, Pseudo Code 1, in a way that can be implemented by the DBMS internal program language (e.g., by L=Program module unit 128). The function doCandidate represents the business logic that is translated into the DBMS internal program logic. Input is the TimeSeries objects and the limit to consider.

Pseudo Code (2)

```
def doCandidate(inputTS, limit):
    result = list( )
    for ts in inputTS:
        if ts.Qty > limit:
            schedule=ScheduleSeries(Date=ts.Date, Qty=ts.Qty)
            result.append(schedule)
    return result
```

Python is a dynamically-typed language, while L is a statically-typed language. Accordingly during the translation at compile time, the types used in the Python program need to be inferred so that the types can be translated within the translated L program. To infer the types at compile time, the Python business logic function(s) need to be annotated with the input argument types (types for other objects can be inferred). The example below (Pseudo Code 4) illustrates the annotation for the function doCandidate. The annotation appears before the function declaration and indicates that the input arguments are the ORM object TimeSeries and an integer.

Pseudo Code (3)

```
@translate(input=TimeSeries( ),int)
def doCandidate(inputTS, limit):
    result = list( )
    for ts in inputTS:
        if ts.Qty > limit:
            schedule=ScheduleSeries(Date=ts.Date, Qty=ts.Qty)
            result.append(schedule)
    return result
```

Figure 3:
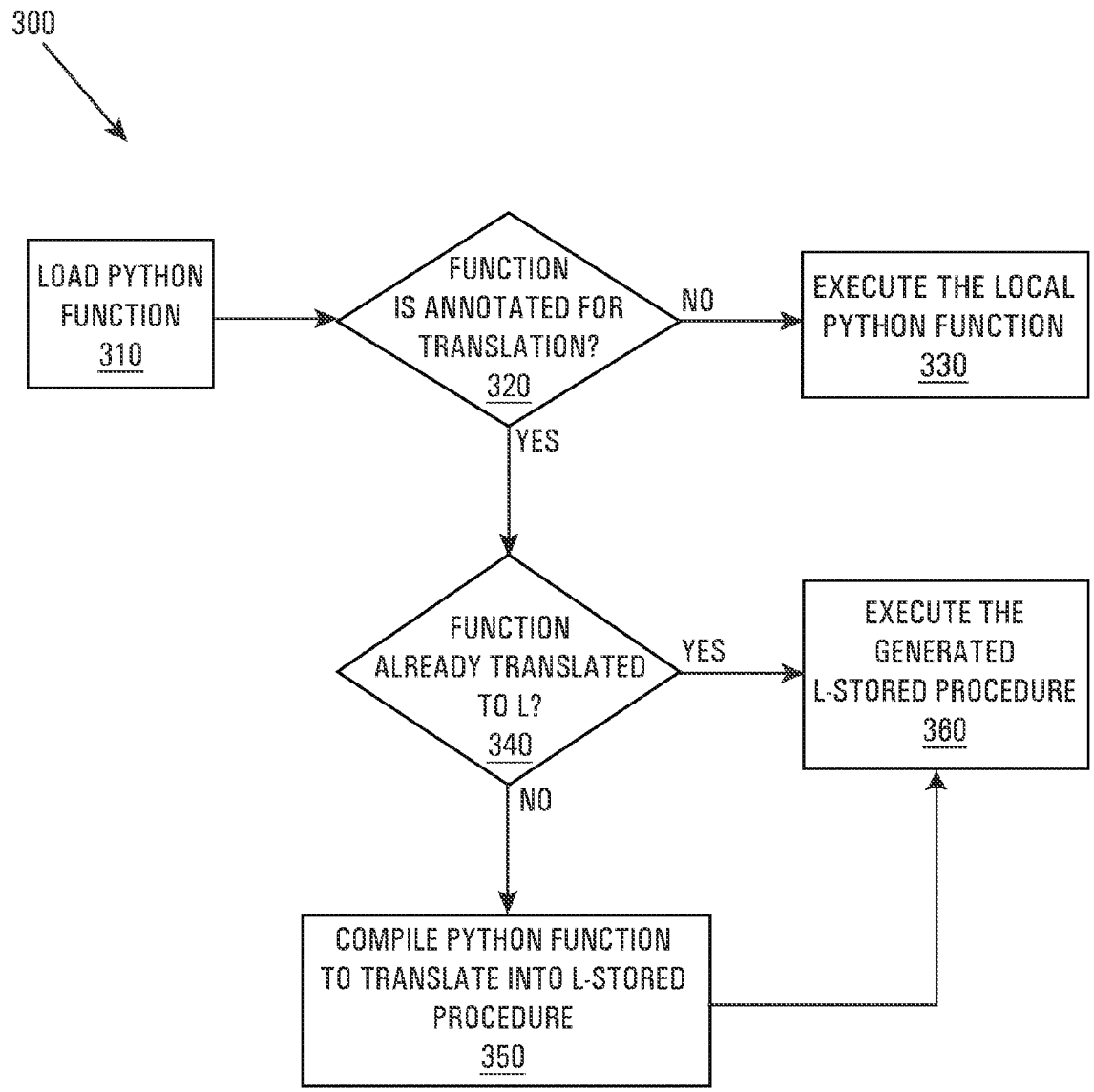
FIG. 3 depicts a global workflow process in accordance with some embodiments.

FIG. 3 depicts global workflow process 300 in accordance with some embodiments. Process 300 is illustrative of running a Python application server, with Python as the business application language, and L program language as the DBMS internal program language. The process can be applicable to other foreign programming languages and/or internal program languages.

The Python function is loaded, step 310. When the function is loaded, the L-program module unit determines, step 320, whether the Python function is annotated for translation. If the function is not annotated for translation, then the local Python function is executed (step 330). If the function is annotated, process 300 continues to step 340.

At step 340, the L-program module unit determines whether the python function is already translated to L-program language (or the DBMS internal programming language). If the function is not translated, the function is compiled to translate it into an L-stored procedure, step 350. At step 360, the L-stored procedure is executed. If at step 340 a determination is made that the function is already translated into L, the L-stored procedure is executed, step 360.

Figure 4:
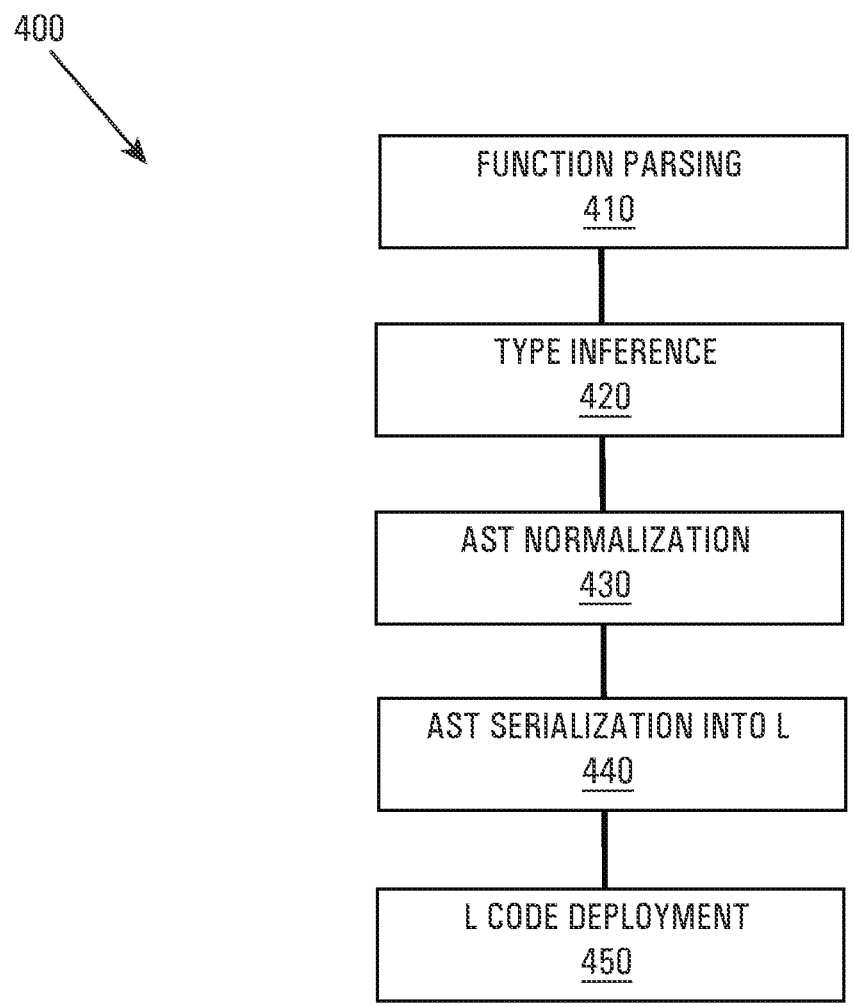
FIG. 4 depicts a compile process in accordance with some embodiments.

FIG. 4 depicts compile time process 400 in accordance with some embodiments. The compiler unit can be located in the L-program module unit, or as a standalone compiler unit which is called by the L-program module unit. Within the compiler unit are other components (i.e., a parser unit, a type inference unit, a normalizer unit, a serializer unit, and a deployer unit). FIG. 4 illustrates the steps undergone to translate a foreign programming language (e.g., Python) business application function into a DBMS internal programming language (e.g., L) program procedure.

A parser unit parses the Python function and nested functions, step 410, to generate an abstract syntax tree (AST) of the function. The remaining portions of compilation process 400 uses the AST.

The type of the internal variable(s) and of the output result is inferred, step 420, by a type inference unit. In one implementation, the inference can be made by propagating the annotated function input type(s) inside the AST to infer the internal variable(s) and function output type(s). For example, given a statement A=B+C, if B and C are integer types, the resultant A is inferred to be an integer type. Further, the manner in which a variable is used can be determinative of its type—for example, a variable used as an index to access a list is an integer type.

A normalizer unit prepares the AST (with its inferred types), step 430, for translation into the internal programming language procedure. Because, normalization rules are type-dependent, the normalization depends on the typing information. In particular, manipulation operations on numeric types (e.g., '+' operation) are handled differently compared to operations on string types. For example, the python statement "a, b=c" can be translated to "a=c" and "b=c", the generated AST can then have the same syntax which simplifies generating the L program stored procedure (step 440, below).

If the DBMS internal programming language (e.g., L language) has a restricted syntax and the foreign programming language (e.g., Python) has a rich syntax, structural transformations can be done during step 430. By way of example, a Python FOR loop would be translated into WHILE loop, which is supported in L language.

During this AST normalization step, Python function calls can be translated into L function calls. For example, the Python call len(myStr) can be directly translated into the L call myStr.getLength( ). If an equivalent L function does not exist, a function template library can generate a function definition that performs equivalent manipulation as the Python function. This generated function can be used to then translate the Python function. For example, the Python call sorted(myList) does not have a direct translation, into L language. Accordingly, the complier unit accesses a library function definition List getSorted(List input_list) and translates the Python call into getSorted(myList).

After AST normalization, the normalized AST is used by a serializer unit to generate, step 440, the L program wrapped in a stored procedure. Because the AST was normalized to accommodate translation into L programming language this operation is straightforward. For each node of the AST, a corresponding L code can be generated. A pre-order traversal of the whole AST generates the whole L program. For example, the statement "a=0" is translated into "size_t a=0 z", where the type is introduced, and the constant 0 is also formatted with respect to the target (i.e., DBMS internal) language.

At step 450, the L-stored procedure is deployed by a deployer unit. The L-programming module unit establishes a connection to the DBMS database to create the stored procedure. Data Definition Language (DDL) commands can be used to install the L program code in the metadata catalog of the DBMS. For example, a conventional stored procedure "creation" statement can insert the stored procedure.

Figure 5:
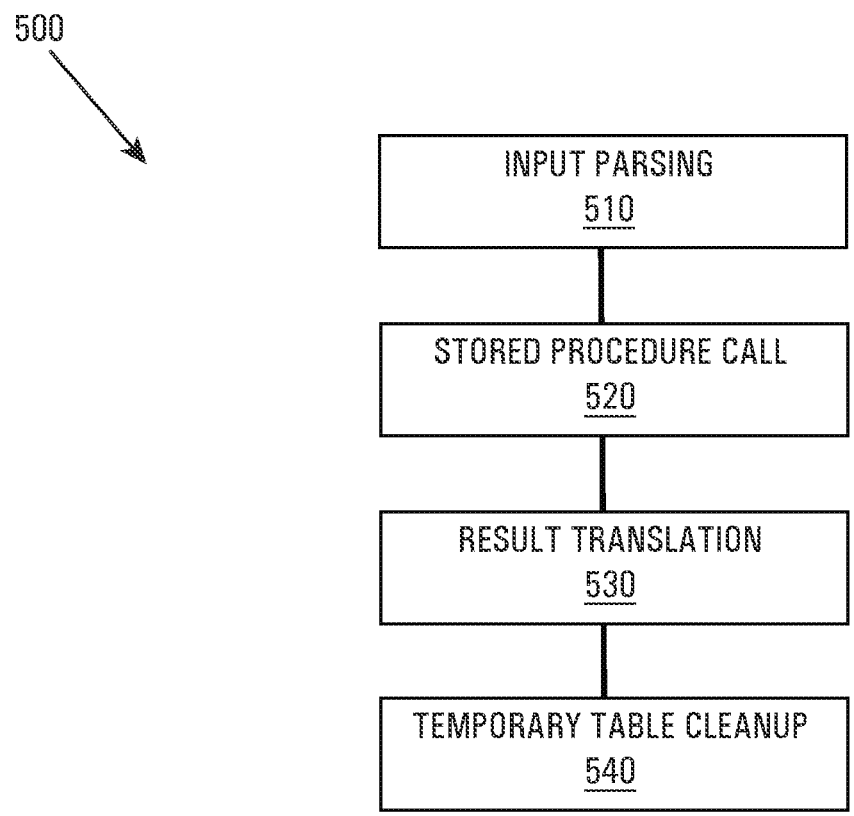
FIG. 5 depicts a runtime process in accordance with some embodiments

FIG. 5 depicts runtime process 500 in accordance with some embodiments. During runtime, the L-programming module unit can intercept the call to the foreign programming language (e.g., Python) function and re-direct the call so as to call the deployed internal programming language (e.g., L) stored procedure. As the stored procedure is executed inside of the DBMS server, the L-programming module unit can manage interaction with the application server, the input/output transfer, and transformation.

The L-programming module unit parses the input, step 510, to analyze the input and output of the function. Temporary tables are created to store the L-stored procedure table inputs/outputs. Also, the input temporary tables are filled when the input tables need to be filled (called-function dependent)

The L-stored procedure is called by the L-programming module unit, step 520. The stored procedure result can be placed into the temporary output table created at step 510. The result is fetched, step 530, from the temporary output table and translated into the output format expected by the business application. After the result is translated, the temporary tables can be cleaned, step 540.

The L-programming module unit can include, or be in communication with, at least one control processor that is configured to support translation of foreign programming language business application(s) into DBMS internal programming language by executing executable instructions accessible by the control processor. Dedicated hardware, software modules, and/or firmware can implement the L-programming module unit.

Figure 6:
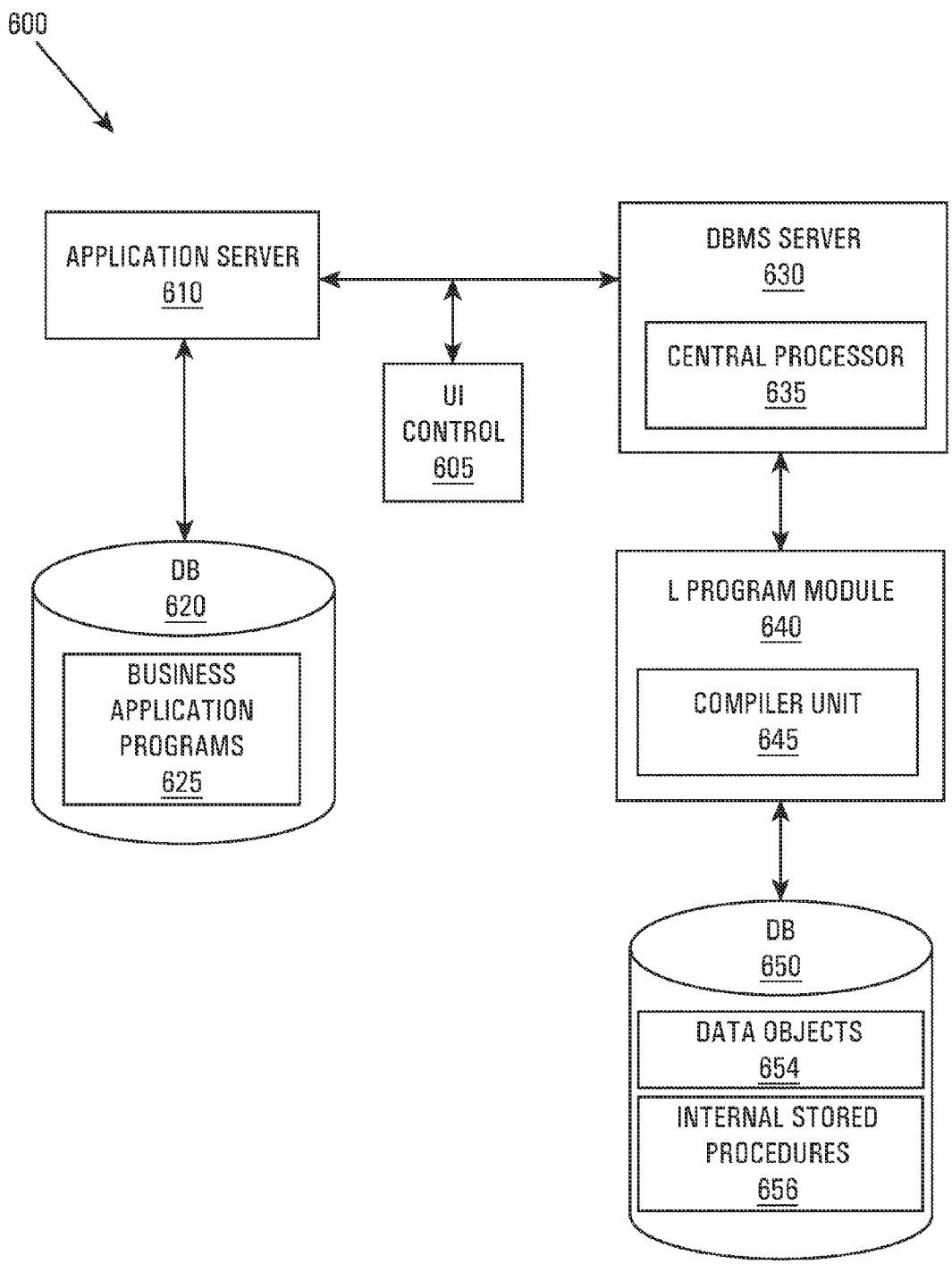
FIG. 6 depicts a system in accordance with some embodiments.

FIG. 6 depicts system 600 that includes a DBMS system in accordance with some embodiments. A user can request analysis of business data stored in the DBMS system by communicating via user interface UI control 605. Application server 610, which is in communication with database 620, accesses a business application program stored in business application program store 625. The DBMS system can include DBMS server 630 which includes central processor 635. The central processor controls components of the DBMS system by executing instructions, or code.

L program module unit 640, in communication with the DBMS server, can intercept a foreign programming language function call and redirect this function call to an internal programming language stored procedure. The internal stored procedure can have been created by compiler unit 645, as described above. Compiler unit 645 can be located in the L-program module unit (as shown), or as a standalone compiler unit which is called by the L-program module unit.

The internal language stored procedure 656 can be resident in database 650, which is in communication with the L program module unit. Also stored in database 650 can be data objects which store business information including, for example, TimeSeries table 124 and ScheduleSeries table 126.

Figure 7:
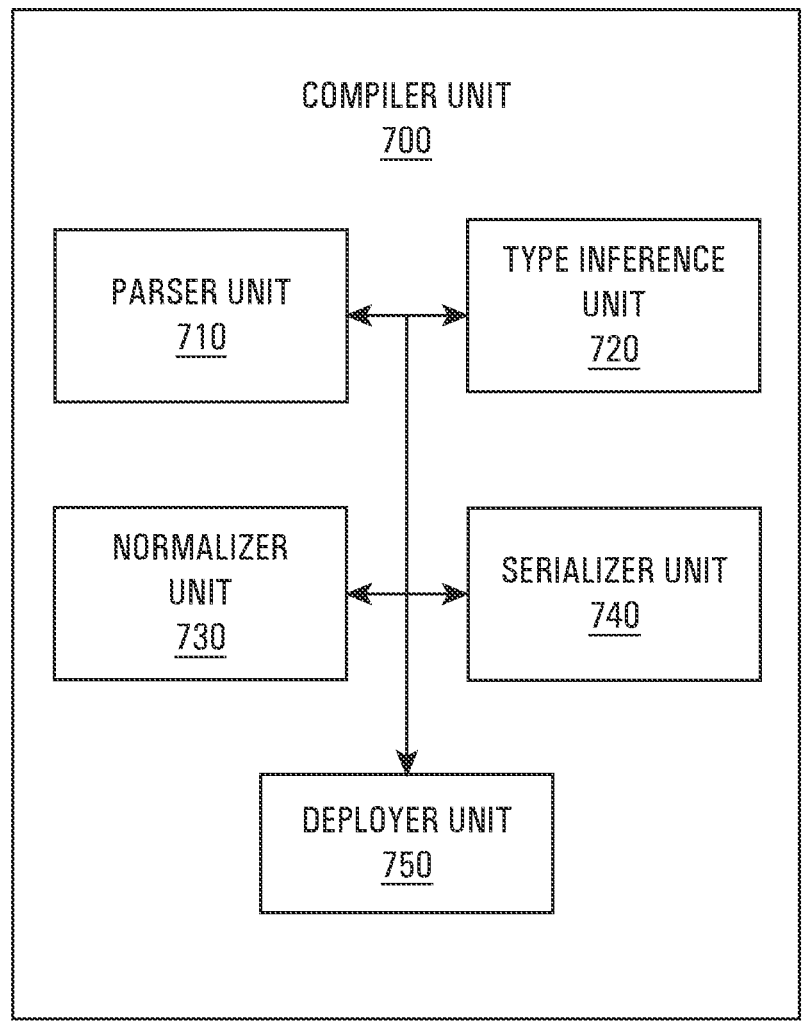
FIG. 7 depicts a complier unit in accordance with some embodiments.

FIG. 7 depicts the structure of compiler unit 700 in accordance with some embodiments. The compiler unit can include parser unit 710, type inference unit 720, normalizer unit 730, serializer unit 740, and deployer unit 750. Parser unit 710 is configured to parse a foreign programming language function, and nested functions. An AST of the function can be generated from the parsing results and stored in database 650.

Type inference unit 720 is configured to infer the type of the internal variables of the function and the type of the function's output. Normalizer unit 730 is configured to prepare the AST and its inferred types for translation into the internal programming language procedure. Serializer unit 740 is configured to generate the internal programming language procedure (e.g., an L program wrapped in a stored procedure). Deployer unit 750 is configured to deploy the internal program procedure.

In accordance with embodiments, data-intensive code is pushed down to the DBMS environment. Developers can use existing high-level programming environment and tools, so that the need to manually write stored procedure code is eliminated. The developer can operate in the foreign language of the application server (e.g., Java, ABAP, Python, etc.).

Embodying implementations allow developers to develop application logic without needing a database resulting in lower cost-of-development for the business application. Additionally, the developers do not need to develop procedures in the DBMS internal language. ORM integration is possible, with rapid development on the application server logic layer without deploying to the database. The execution location (application server/database server) can be chosen dynamically at runtime.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for translating a foreign programming language business application into a DBMS's internal programming language procedure in accordance with embodiments.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method for generating a database management system (DBMS) internal program language function from a foreign program language function, the method comprising:
    loading the foreign program language function into a DBMS server;

an internal program module unit examining the foreign program language function to determine whether the foreign program language function is annotated for translation;

if the foreign program language function is annotated for translation, determining by the internal program module unit if the foreign program language function is translated into a DBMS internal program language function in a database accessible to the DBMS;

if the DBMS internal program language function exists, executing the internal program language function by the DBMS server, else the internal program module unit compiling the foreign program language function into an internal program language function;

if the foreign program language function is not annotated for translation, executing the foreign program language function;

a parsing unit parsing the foreign program language function;

generating an abstract syntax tree of the parsed foreign program language function;

a type inference unit inferring a type of internal variables of the foreign program language function and output results;

a normalizer unit preparing the abstract syntax tree for translation;

a serializer unit generating an internal program language program wrapped in a stored procedure; and a deployer unit creating the stored procedure.

2. The method of claim 1, the inferring step including propagating annotated function input types inside the abstract syntax tree.

3. The method of claim 1, the preparing step including one of directly translating a foreign program language function call into a DBMS internal program language function call and generating a function definition in the DBMS internal program language to perform the foreign program language function call.

4. The method of claim 1, the generating step including generating a corresponding internal program language code for a node of the abstract syntax tree.

5. The method of claim 1, the creating step including installing the internal program language code in a metadata catalog of the DBMS.

6. The method of claim 1, wherein the loading step includes accessing an application server remote from the DBMS server.

7. The method of claim 1, wherein the foreign program language function is a business application function.

8. A non-transitory computer readable medium having stored thereon instructions which when executed by a processor cause the processor to perform the method of:

loading the foreign program language function into a database management system (DBMS) server;

an internal program module unit examining a foreign program language function to determine whether the foreign program language function is annotated for translation;

if the foreign program language function is annotated for translation, determining by the internal program module unit if the foreign program language function is translated into a DBMS internal program language function in a database accessible to the DBMS;

if the DBMS internal program language function exists, executing the internal program language function by the DBMS server, else the internal program module unit compiling the foreign program language function into an internal program language function;

if the foreign program language function is not annotated for translation, executing the foreign program language function;

parsing the foreign program language function;

generating an abstract syntax tree of the parsed foreign program language function;

inferring a type of internal variables of the foreign program language function and output results;

preparing the abstract syntax tree for translation;

generating an internal program language program wrapped in a stored procedure; and creating the stored procedure.

9. The non-transitory computer readable medium of claim 8, the inferring step including propagating annotated function input types inside the abstract syntax tree.

10. The non-transitory computer readable medium of claim 8, the preparing step including one of directly translating a foreign program language function call into a DBMS internal program language function call and generating a function definition in the DBMS internal program language to perform the foreign program language function call.

11. The non-transitory computer readable medium of claim 8, the generating step including generating a corresponding internal program language code for a node of the abstract syntax tree.

12. The non-transitory computer readable medium of claim 8, the creating step including installing the internal program language code in a metadata catalog of the DBMS.

13. The non-transitory computer readable medium of claim 8, wherein the loading step includes accessing an application server remote from the DBMS server.

14. A system comprising:

a database management system (DBMS) server in communication with an application server, the application server coupled to a database containing business application programs;

the DBMS server including a control processor and an internal program module unit configured to translate a business application program from a foreign program language function into a DBMS internal program language function;

the DBMS server coupled to a database containing at least one internal program language procedure and one or more data objects;

a compiler unit including:

a parsing unit configured to parse the foreign program language function and generate an abstract syntax tree of the parsed foreign program language function;

a type inference unit configured to infer a type of internal variables of the foreign program language function and output results;

a normalizer unit configured to prepare the abstract syntax tree for translation;

a serializer unit configured to generate an internal program language program wrapped in a stored procedure; and a deployer unit configured to create the stored procedure.

15. The system of claim 14, wherein the internal program module unit is in communication with a compiler unit.

16. The system of claim 15, wherein the compiler unit is located in the internal program module unit.

* * * * *